United States Patent [19]

Rother et al.

[11] 4,436,781
[45] Mar. 13, 1984

[54] CENTRIFUGALLY CAST POLE COMPRISED OF A REINFORCED RESIN FOR SUPPORTING A LIGHT OR THE LIKE UPON AN END THEREOF

[75] Inventors: Bruno Rother, Neumarkt; Hartmut Trommen, Postbauer-Heng, both of Fed. Rep. of Germany

[73] Assignee: G.A. Pfleiderer GmbH & Co., KG, Neumarkt, Fed. Rep. of Germany

[21] Appl. No.: 395,230

[22] Filed: Jul. 6, 1982

Related U.S. Application Data

[62] Division of Ser. No. 229,410, Jan. 29, 1981, abandoned.

[30] Foreign Application Priority Data

Aug. 29, 1980 [DE] Fed. Rep. of Germany ....... 3032574

[51] Int. Cl.$^3$ ..................... B29C 5/04; B32B 31/00; E04C 3/30; E04H 12/00
[52] U.S. Cl. ..................... 428/365; 52/40; 52/720; 264/257; 264/311
[58] Field of Search ............... 428/131, 134, 135, 136, 428/137, 138, 233, 256, 285, 365, 377, 36, 364; 264/257, 255, 258, 270, 311; 362/431; 52/40, 720, 727, 730

[56] References Cited

U.S. PATENT DOCUMENTS

| 383,599 | 5/1888 | Suhr | 428/233 |
| 2,824,033 | 2/1958 | Donaldson | 264/311 X |
| 3,574,104 | 4/1971 | Medler | 264/258 X |
| 4,002,715 | 1/1977 | Usui | 264/311 X |
| 4,119,748 | 10/1978 | Verbauwhede | 428/285 X |

FOREIGN PATENT DOCUMENTS 54-132672 10/1979 Japan.

Primary Examiner—Lorraine T. Kendell
Attorney, Agent, or Firm—Jordan and Hamburg

[57] ABSTRACT

A reinforcement for a centrifugally cast, synthetic resin pole comprises a woven wire cloth interposed between a mat and an inner layer of a fibrous material. The mat is permeable to the synthetic resin and has a specific gravity lower than the specific gravity of the synthetic resin so that when the pole is fabricated, the mat and the entire reinforcement float on the synthetic resin and are ultimately disposed in the interior of the pole wall. Means for securing a lamp or the like to the pole, such as set screws or collar bands, penetrate the pole only to the woven wire cloth so that further penetration is prevented when the pole is swayed and any wobble or play between the lamp and the pole is avoided.

7 Claims, 4 Drawing Figures

CENTRIFUGALLY CAST POLE COMPRISED OF A REINFORCED RESIN FOR SUPPORTING A LIGHT OR THE LIKE UPON AN END THEREOF

This is a division of application Ser. No. 229,410, filed Jan. 29, 1981, now abandoned.

BACKGROUND OF THE INVENTION

The present invention relates to a centrifugally cast, reinforced synthetic resin pole, particularly a pole with a reinforcement comprising a mat permeable by the synthetic resin and having a specific gravity slightly lower than the specific gravity of the synthetic resin and comprising an inner layer of fibers oriented in the longitudinal direction of the pole.

Such poles are commonly encircled at the top end thereof by a pipe-shaped base of a lamp or of a lamp extension arm or by a collar band for clamping the lamp or extension arm to the pole. Where a pipe-shaped base is used, a plurality of equiangularly arranged set screws extend through the base and frictionally abut the pole surface. However, when either a collar band or set screws are used, wind action and the associated swaying at the pole causes the collar band or the set screws to work themselves into the pole, which results in an undesirable wobble or play between the lamp and the pole. Heretofore no practical and economical means have been found to effectively prevent these effects. Consequently it is an object of the present invention to provide a fastening between the pole and the encircling pipe-shaped base that avoids the disadvantages of prior fastening means without incurring excessive cost.

The present invention overcomes the above mentioned disadvantages of prior fastening devices by providing the reinforcement with a layer of flexible wire cloth in the region where the base encircles the pole. The flexible wire cloth layer is especially suited for use in a reinforcement such as that described in our copending U.S. Patent Application Ser. No. 229,409, filed on Jan. 29, 1981, now U.S. Pat. No. 4,383,965 entitled "Centrifugal Process For The Production Of A Pipe-shaped Body And A Pipe-shaped Body Produced According To The Centrifugal Process," the disclosure of which is hereby incorporated herein by reference. The special reinforcement disclosed therein insures that the inner layer of fibers will not penetrate to the surface, but rather will stay well within the pole wall. During the manufacture of a pole with such a reinforcement, the resin sprayed into the rotating mold penetrates the reinforcement, and particularly its outer resin penetrable mat layer, such that the mat floats on the resin due to the lower specific gravity of the resin. If a woven wire cloth is embedded in this reinforcement, it also will float with the mat, and will stay well within the pole wall. When the synthetic resin hardens, the woven wire cloth serves as a substantially impenetrable reinforcement for the pole. When the collar band or set screws are tightened, they penetrate only the outermost surface layer of the hardened synthetic resin and then strike the woven wire, where they not only encounter solid resistance, but also find a sort of anchoring. Thus, the woven wire cloth prevents the collar band or set screws from working themselves any further into the pole and wobbling or play between the lamp and the pole is eliminated.

It is contemplated that the length of the woven wire cloth is slightly less then the circumference of the outside surface of the pole at its top end such that the ends of the cloth just meet in its floated position. However, the wire preferably consists of strong, rust-proof metal such as stainless steel. The rust-proof property is especially important because the cloth may be exposed to some rainwater and air when the collar band or set screws abut the cloth.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

DESCRIPTION OF THE PREFERRED EMBODIMENTS

Figure 1:
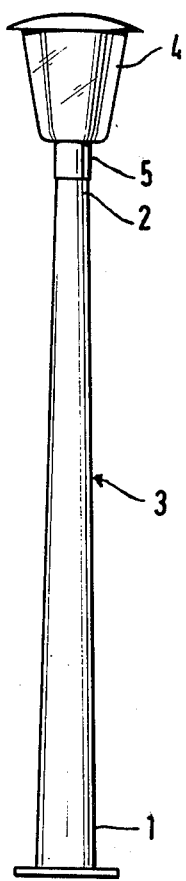
FIG. 1 is an illustration of a pole supporting a lamp according to the present invention.
Figure 2:
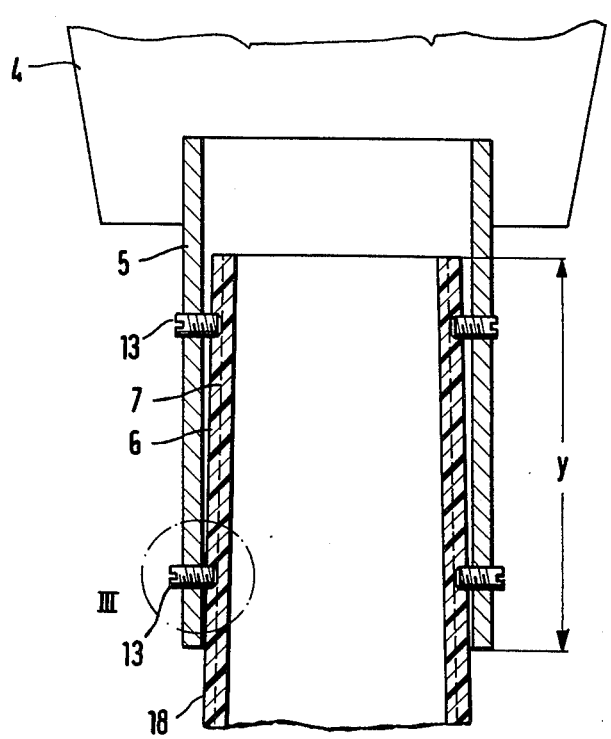
FIG. 2 is a partial cross-sectional view of the top end of the pole and the lamp shown in FIG. 1 taken in a plane including the longitudinal axis of the pole.

As shown in FIG. 1, a pole tapering conically from its base to its top end supports a lamp 4 having a pipe-shaped base or foot 5 which, as shown in FIG. 2, is mounted over and around the top end 6 of the pole. The pole 3 comprises centrifugally cast synthetic resin having a reinforcement 7 embedded therein in such a manner that it does not protrude to the outer surface 18 of the pole, but rather is surrounded by synthetic resin.

Figure 3:
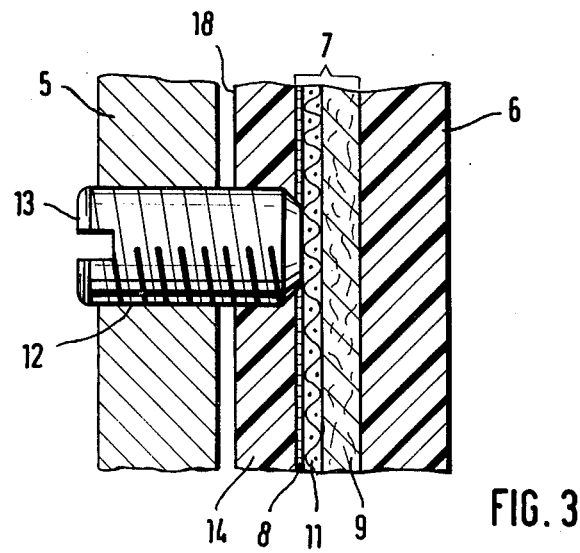
FIG. 3 is an enlarged view of the area designated by Roman numeral III in FIG. 2.
Figure 4:
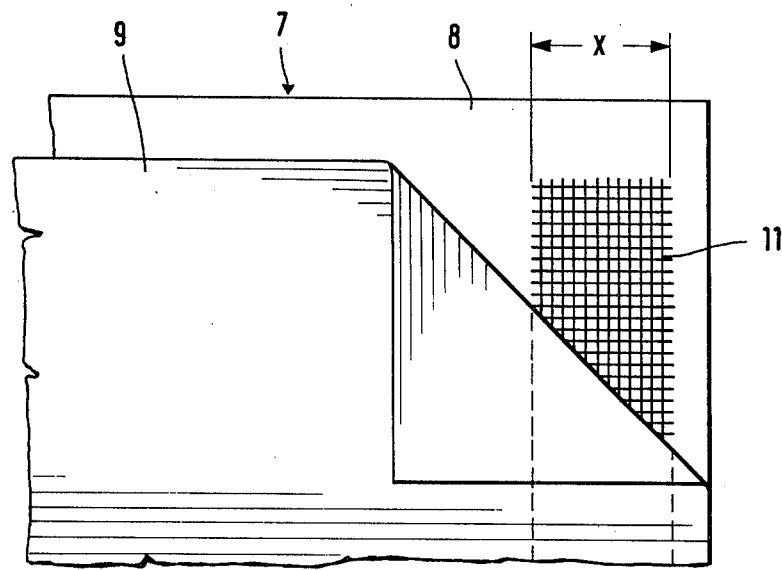
FIG. 4 is a frontal view of the unrolled reinforcement with a partly rolled back layer to reveal the woven wire cloth according to the present invention.

The reinforcement 7 comprises an outer mat 8 penetrable by the synthetic resin and having a specific gravity slightly lower than the specific gravity of the synthetic resin. As shown in FIGS. 3 and 4, the mat 8 lies at the outside of the reinforcement and is covered by a fibrous layer 9 preferably comprised of mineral, or glass or similar fibers oriented in the direction of the longitudinal axis 10 of pole 3.

According to the present invention, a woven wire cloth 11 is interposed or sandwiched between the mat 8 and the fibrous layers 9. The breadth x of the cloth 11 approximates the length y by which the pipe-shaped foot 5 of the lamp 4 extends around the top end 6 of the pole 3.

The foot 5 is provided with a plurality of threaded holes 12 which for example are distributed in vertically disposed pairs equiangularly around the circumference thereof at 120° intervals. In each of these threaded holes 12 is a set screw 13 which, when tightened, penetrates the outer synthetic resin layer 14 of the pole 3. Upon further tightening, the set screw encounters the solid resistance of the wire cloth 11. Even swaying of the pole 3 will not cause the set screw to work into the pole wall beyond the wire cloth 11, so that play between the lamp 4 and the pole 3 is avoided.

The mat 8 may be fashioned of synthetic, textile or other natural fibers such as woodpulp, paper or similar materials. A woven mat is especially preferred because such a structure possesses the needed permeability to the synthetic resin. The mat may also comprise a perforated material.

It is thought that the invention and many of its attendant advantages will be understood from the foregoing description and that it will be apparent that various changes may be made in the form, construction, and arrangements of the parts without departing from the spirit and scope of the invention or sacrificing all of its material advantages. The form heretofore described being merely a preferred embodiment thereof.

What is claimed is:

1. A reinforced synthetic resin tapered pole comprising an elongated tapered pole formed by centrifugally casting a synthetic resin reinforcement means embedded within said pole without protruding to the outer surface of said pole, said reinforcement means comprising an outer mat which is penetrable by said synthetic resin and which has a specific gravity slightly lower than the specific gravity of said synthetic resin such that during said centrifugal casting, the synthetic resin passes radially outwardly through said mat to form an outer radial layer of synthetic resin as said mat floats on said outer radial layer of synthetic resin due to the lower specific gravity of said synthetic resin, said reinforcement means further comprising fibrous material penetrable by said synthetic resin and disposed on the radial inner side of said mat, said reinforcement means maintaining said fibrous material within the walls of said pole and preventing said fibrous material from penetrating the outer surface of said pole, a wire cloth embedded within said pole between said mat and said fibrous material, said wire cloth extending along a portion of the longitudinal length of said pole, and an attachment member attached to said pole by attachment elements, said attachment elements penetrating said outer layer of synthetic resin to said wire cloth which provides a solid resistance to further penetration by said attachment elements, whereby a firm attachment of said attachment member to said pole is thereby achieved.

2. A reinforced synthetic resin tapered pole according to claim 1 wherein the fibers of the fibrous material are oriented in the longitudinal direction of said pole.

3. A reinforced synthetic resin tapered pole according to claim 1 wherein the width of the wire cloth is slightly less than the circumference of the outer surface of the pole which it reinforces.

4. A reinforced synthetic resin tapered pole according to claim 1 wherein the longitudinal length of said wire cloth is approximately equal to the longitudinal length of said attachment member.

5. A reinforced synthetic resin tapered pole according to claim 1 wherein said wire cloth comprises stainless steel.

6. A reinforced synthetic resin tapered pole according to claim 1 wherein said attachment member comprises a collar disposed on the outside of said pole, said attachment elements comprising elongated threaded members having their axes generally radially disposed, said threaded members being threaded in said collar so as to advance radially inwardly to penetrate into said outer layer of synthetic resin until further penetration is precluded by engagement with said wire cloth.

7. A reinforced synthetic resin tapered pole comprising reinforcement means embedded within said pole without protruding to the outer surface of said pole, said reinforcement means comprising an outer mat which is penetrable by said synthetic resin and which has a specific gravity slightly lower than the specific gravity of said synthetic resin such that during centrifugal casting of said pole, the synthetic resin passes radially outwardly through said mat to form an outer radial layer of synthetic resin as said mat floats on said outer radial layer of synthetic resin due to the lower specific gravity of said synthetic resin, said reinforcement means further comprising fibrous material penetrable by said synthetic resin and disposed on the radial inner side of said mat, said reinforcement means maintaining said fibrous material within the walls of said pole and preventing said fibrous material from penetrating the outer surface of said pole, and a wire cloth embedded within said pole between said mat and said fibrous material, said wire cloth extending along a portion of the longitudinal length of said pole.

* * * * *